(12) United States Patent
Wiener

(10) Patent No.: US 8,304,936 B2
(45) Date of Patent: Nov. 6, 2012

(54) INTERACTIVE APPLIANCES, APPLIANCE SYSTEMS AND APPLIANCE CONTROL METHODS, AND CONTROLS THEREFOR

(76) Inventor: William Wiener, Toronto (CA)

( * ) Notice: Subject to any disclaimer, the term of this patent is extended or adjusted under 35 U.S.C. 154(b) by 0 days.

(21) Appl. No.: 12/709,001

(22) Filed: Feb. 19, 2010

(65) Prior Publication Data

US 2010/0141045 A1    Jun. 10, 2010

Related U.S. Application Data

(63) Continuation of application No. PCT/CA2008/001483, filed on Aug. 20, 2008.

(60) Provisional application No. 60/935,598, filed on Aug. 21, 2007.

(51) Int. Cl.
*H01H 35/00* (2006.01)
*H04W 88/00* (2009.01)

(52) U.S. Cl. ........................................................ 307/116
(58) Field of Classification Search .................... 307/116
See application file for complete search history.

(56) References Cited

U.S. PATENT DOCUMENTS

| | | |
|---|---|---|
| 4,792,731 A | 12/1988 | Pearlman et al. |
| 5,293,097 A | 3/1994 | Elwell |
| 5,457,442 A | 10/1995 | Lucero |
| 5,475,360 A | 12/1995 | Guidette et al. |
| 5,489,827 A | 2/1996 | Xia |
| 5,745,035 A | 4/1998 | Deyo |
| 5,971,597 A | 10/1999 | Baldwin et al. |
| 6,078,253 A * | 6/2000 | Fowler ........................... 340/501 |
| 6,340,864 B1 | 1/2002 | Wacyk |
| 6,363,139 B1 * | 3/2002 | Zurek et al. ................... 379/56.1 |
| 6,388,399 B1 | 5/2002 | Eckel et al. |
| 6,608,453 B2 | 8/2003 | Morgan et al. |
| 6,746,274 B1 | 6/2004 | Verfuerth |
| 6,831,558 B1 | 12/2004 | Andrew |
| 6,990,394 B2 | 1/2006 | Pasternak |
| 7,122,976 B1 | 10/2006 | Null et al. |

(Continued)

FOREIGN PATENT DOCUMENTS

WO    WO 2006/095316    9/2006

OTHER PUBLICATIONS

International Search Report for PCT/CA2008/001483 dated Dec. 4, 2008, 4 pgs.

(Continued)

*Primary Examiner* — Adi Amrany
(74) *Attorney, Agent, or Firm* — Schwegman Lundberg & Woessner, P.A.

(57) ABSTRACT

An appliance control circuit has an occupancy sensor, a control signal receiver, a control signal transmitter, a control element, and a power supply. In operation, when the occupancy sensor senses an occupant, the occupancy sensor outputs a signal to cause the control element 9 to control power from the source of power to the appliance. Similarly, when a control signal is received by the control signal receiver the receiver outputs a signal to cause the control element to control power from the source of power to the appliance. At the same time, the control signal transmitter is activated based on the signal from the occupancy sensor. Multiple control circuits can be used to control one another. The appliance could be for example a light, a thermostat, or a camera.

13 Claims, 13 Drawing Sheets

U.S. PATENT DOCUMENTS

| | | | | |
|---|---|---|---|---|
| 7,242,305 B2 * | 7/2007 | Cuddihy et al. | 340/573.1 |
| 7,411,489 B1 * | 8/2008 | Elwell et al. | 340/501 |
| 7,677,799 B2 * | 3/2010 | Jensen et al. | 378/205 |
| 7,772,540 B2 * | 8/2010 | Pasternak | 250/222.1 |
| 7,843,353 B2 * | 11/2010 | Pan et al. | 340/600 |
| 2003/0020595 A1 * | 1/2003 | Wacyk | 340/3.5 |
| 2003/0151909 A1 * | 8/2003 | Sid | 362/85 |
| 2004/0240132 A1 | 12/2004 | Hudson | |
| 2006/0044152 A1 * | 3/2006 | Wang | 340/825 |

OTHER PUBLICATIONS

"Canadian Application Serial No. 2,696,986, Office Action mailed Apr. 2, 2012", 6 pgs.

"International Application No. PCT/CA2008/001483, International Preliminary Report on Patentability dated Feb. 24, 2010", 8 pgs.

"International Application No. PCT/CA2008/001483, Written Opinion mailed Dec. 4, 2008", 7 pgs.

* cited by examiner

INTERACTIVE APPLIANCES, APPLIANCE SYSTEMS AND APPLIANCE CONTROL METHODS, AND CONTROLS THEREFOR

CROSS-REFERENCE TO RELATED APPLICATION

This application is a continuation of PCT patent application no. PCT/CA2008/001483 filed Aug. 20, 2008 under the title INTERACTIVE APPLIANCES, APPLIANCE SYSTEMS AND APPLIANCE CONTROL METHODS, AND CONTROLS THEREFOR which claims the benefit of the filing date of U.S. Provisional Patent Application No. 60/935,598 filed Aug. 21, 2007 under the title INTERACTIVE APPLIANCES, APPLIANCE SYSTEMS AND APPLIANCE CONTROL METHODS, AND CONTROLS THEREFOR.

The content of the above patent applications is hereby expressly incorporated by reference into the detailed description hereof.

FIELD OF THE INVENTION

The invention relates to appliances, appliance systems and to appliance control methods, and controls therefor.

BACKGROUND OF THE INVENTION

It has been recognized for a long time that appliance costs, including energy, operation and maintenance costs, can be a significant expense, and that the generation and use of energy for operation of appliances can have an impact on the environment. Appliances may include, for example, lights. Other examples include thermostats and cameras.

It has been recognized that many appliances can be utilized differently depending upon whether or not a space within which the appliances operate is occupied. For example, often lights can be turned off when the space is unoccupied, a thermostat set for heating often can be turned down when the space is unoccupied, and cameras often need only be activated when a space is occupied.

Lighting systems in particular have been the subject of many attempts to save costs through automated controls. Many different lighting systems, light fixtures, controls for lights, and methods of operating lights have been proposed or are in use in an attempt to reduce energy consumption for lighting.

Improvements or alternatives are desirable for existing appliances, appliance systems and appliance control methods, and controls therefor.

SUMMARY OF THE INVENTION

In a first aspect the invention provides an appliance control circuit for use with an appliance. The control circuit includes an occupancy sensor, a control signal receiver, a control signal transmitter operatively connected to the occupancy sensor, a control element operatively connected to the occupancy sensor and to the control signal receiver, and an output from the control element for operative connection to the appliance. The control element controls the output upon occupancy sensed by the occupancy sensor. The control element controls the output based upon receipt of a control signal by the control signal receiver. The control signal transmitter transmits a control signal upon occupancy sensed by the occupancy sensor.

The control circuit may further include a power supply for providing power to components of the control circuit. The control circuit may have an input for operative connection to a source of power for the appliance. The control element may control power to the output from the source of power. The control element may control power to the output to increase the amount of power supplied to the appliance. The control element may control the power to the output to activate the appliance.

The control element may include a normally open switch which provides the output. The control element may include a relay which provides the output. The control element may include a triac which provides the output. The control element may include a microprocessor to control the operation of the control element. The control element may include a microcontroller to control the operation of the control element.

The control signal transmitter may transmit an ultrasonic control signal. The control signal receiver may be a microphone. The control signal transmitter may be a speaker. The control signal receiver may be an ultrasonic transducer. The control signal transmitter may be an ultrasonic transducer. The control signal receiver ultrasonic transducer and the control signal transmitter ultrasonic transducer may be one ultrasonic transducer.

The control signal receiver ultrasonic transducer may be a piezoelectric ultrasonic transducer, and the control signal transmitter ultrasonic transducer may be a piezoelectric ultrasonic transducer.

Signal strength of the control signal transmitter may be settable. Signal strength of the control signal transmitter may be settable on-site. Reception sensitivity of the control signal receiver may be settable. Reception sensitivity of the control signal receiver is settable on-site.

In a second aspect the invention provides a system including a plurality of control circuits of the first aspect, and a plurality of appliances. Each appliance is associated with a respective one of the control circuits such that the appliance is operatively connected to the output of the control circuit.

The appliances and their associated control circuits may be installed such that at least one control circuit associated with an appliance is within range of another control circuit to allow for control signals transmitted from the other control circuit to be received by the at least one control circuit.

The appliances and their associated control circuits may be installed such that one control circuit is within range of at least one other control circuit associated with an appliance to allow for control signals transmitted from the one control circuit to be received by the at least one other control circuit.

The appliances and their associated control circuits may be installed such that a plurality of the control circuits are within range of a plurality of control circuit associated with an appliance to allow for control signals transmitted from the one control circuit to be received by the at least one other control circuit.

The appliances may be lighting appliances. The appliances may be lights. The appliances may be thermostats. The appliances may be cameras. The appliances may be any appliances that are controllable based on output from an occupancy sensor.

In a third aspect the invention provides a light fixture for use in association with a light. The light fixture includes a housing for the light, and a control circuit in accordance with the first aspect of the invention wherein the light is the appliance. The control circuit is associated with the housing.

The control circuit may be housed within the housing.

In a fourth aspect the invention provides a method of operating a control circuit for use in association with an appliance.

The method includes the steps of sensing for occupancy using an occupancy sensor in the control circuit and receiving a control signal through a control signal receiver in the control circuit. If occupancy is sensed or control signals are received then a control signal is transmitted through a control signal transmitter in the control circuit and an output is provided from the control circuit to control the appliance.

The control signal transmitter may transmit ultrasonic control signals. The control signal receiver may receive ultrasonic control signals.

In a fifth aspect the invention provides a method of operating a plurality of control circuit for use in association with a plurality of appliance. The method includes the steps of, for each of a plurality of control circuits, sensing for occupancy using an occupancy sensor in the control circuit and receiving a control signal through a control signal receiver in the control circuit. If occupancy is sensed or control signals are received then transmitting a control signal through a control signal transmitter in the control circuit and providing an output from the control circuit to control the appliance. Each of the plurality of control circuits is within range of at least one other control circuit for the transmission and reception of control signals between control circuits.

The control signal transmitters may transmit ultrasonic control signals. The control signal receivers may receive ultrasonic control signals.

Other aspects of the invention will be evident from the principles contained in the description and drawings herein.

BRIEF DESCRIPTION OF THE DRAWINGS

For a better understanding of the present invention and to show more clearly how it may be carried into effect, reference will now be made, by way of example, to the accompanying drawings that show the preferred embodiment of the present invention and in which.

DETAILED DESCRIPTION OF THE PREFERRED EMBODIMENT

Figure 1:
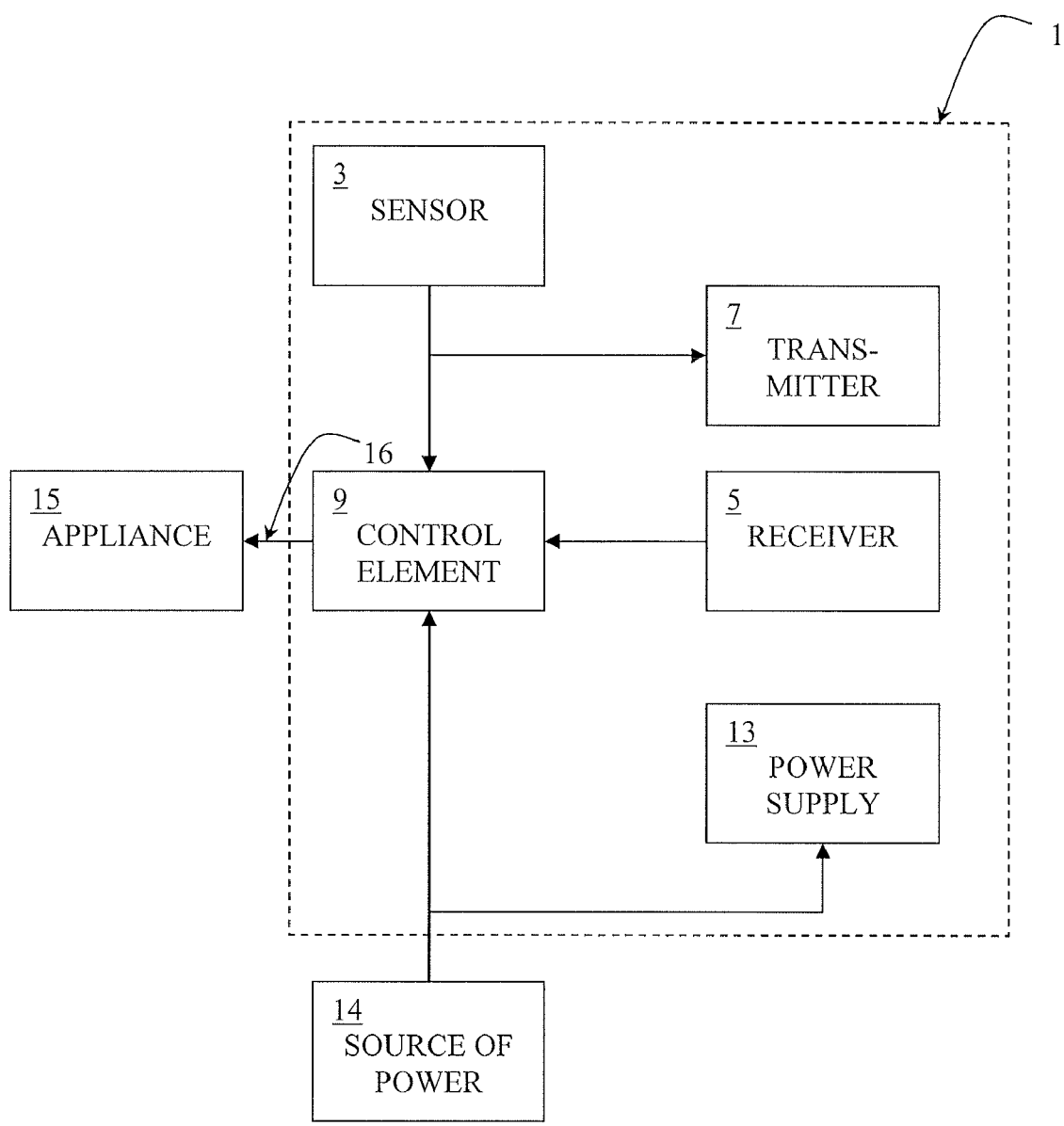
FIG. 1 is a block diagram of a control circuit in accordance with an embodiment of the invention connected between a source of power and an appliance.

Among other things described herein are example embodiments of systems incorporating control circuits arranged in an array where such control circuits operate independently as well as interdependently in order to broaden the responsive area or range of operation of any one control circuit. Examples include those where there is no direct electrical connection between control circuits. The control circuits detect occupancy and act on it.

In some example embodiments each control circuit in the array transmits a coded (addressed) or non coded signal to other control circuits within a preset or settable range in which it provides other control circuits (for example control circuits with the same code, if signals are coded) within this range a message such as to turn appliances that are directly connect to the receiving control circuit either on or off or to activate in some manner for a preset or settable time (coding may be as simple as a different frequency band or channel). Each device is to be in the range of transmission of at least one other control circuit (using the same coding, where there is coding). Not every control circuit needs to operate an appliance directly as some may be used simply for transmitting a signal. Not every control circuit needs to have its own occupancy sensor, but may rely on receiving transmissions from other control circuits within range, in order to activate the appliance directly connected to it. The smallest array shall consist of at least two control circuits, operating at the same coded frequency installed within range of each other. Any control circuit may be a member of multiple arrays, each array operating with a different coding. For example: two hallways running parallel to each other might use different coded control circuits but a hallway joining these two parallel hallways might have control circuits coded with both codes. Where coded transmissions are used, the receiver on any control circuit may use different coding than that control circuit's transmitter. This is useful where different codes are used for different types of appliances. Multiple channels may be provided for each control circuit in order to operate multiple appliances that are attached to that control circuit. Each channel may be operated by a separate coded frequency received by that control circuit. Each control circuit may activate one or multiple appliances connected directly to it. Each control circuit through its own occupancy sensor may activate all appliances connected directly to it.

Also described herein are example embodiments wherein a system incorporates control circuits in an array of at least two control circuits within range of one another that detect occupancy and communicate such occupancy to other control circuits in the array. Each control circuit that receives a notice of occupancy acts on it by activating (or otherwise controlling) one or more appliances such as lights, connected directly to that control circuit. A control circuit that receives a notice of occupancy through its occupancy sensor may communicate such occupancy through its transmitter for the duration of time that it receives such notice and for a period of time afterwards. It may also act on such notice of occupancy by controlling the appliances connected to that control circuit for the duration of time that it receives such notice and for a period of time afterwards. A control circuit that receives a notice of occupancy through its receiver, may act on it by controlling the appliance connected to that control circuit, for the duration that it receives such notice of occupancy and for a period of time afterwards. In some embodiments the control circuit may also be able to relay such occupancy through its transmitter, but this time only for the period that it receives the transmission as the transmission that it receives already would be for both the duration of time that there is occupancy plus a period of time. A control circuit may be a member of one or more arrays.

Each control circuit may contain the following components: an occupancy sensor, transmitter, receiving power supply and controller. Not every device need contain every component. For example a control circuit might not have an appliance connected to it but might be used to detect occupancy and communicate this occupancy to other control circuits that are connected to appliances.

A control circuit may be free standing or may be combined within an appliance or may be part of the appliance.

An occupancy sensor detects occupancy through one or more sensing methods, such as for example through motion, touch, breaking a light beam, pressure, moisture, contact and using one or more sensor types, such as for example passive infrared, light, ultrasonic, contact switches. The example sensing methods and sensor types are not intended to be exhaustive. Other methods and types could be used. The output of the sensor sends a signal to a controller.

A transmitter transmits coded or uncoded output sending a message through one or more channels. Each array may utilize its own channel. The transmission may use one or more transmission methods, such as for example ultrasonic, infrared, RF (radio frequency), line carrier. The transmission range may be preset or adjustable.

A receiver receives a message through one or more channels. Such messages may be in coded or uncoded format. Sensitivity may be preset or adjustable.

A power supply may accept power from a power source that drives the appliance or may have an independent power source.

A controller controls output to control the appliance or the transmitter based on the output of the occupancy sensor or the message received at the receiver. The controller output may for example be a signal, logic output, message (sequence of information) or a relay output.

Referring to FIG. 1, an appliance control circuit 1 has an occupancy sensor 3, a control signal receiver 5, a control signal transmitter 7, a control element 9, and a power supply 13. The control circuit 1 is operatively connected between source of power 14 (such as AC line voltage 14 as shown in FIG. 1) and an appliance 15. Operative connection of the control element 9 to the appliance is provided through an output 16 of the control element 9 and the control circuit 1. The control signal receiver 5 is operatively connected to the control element 9. The occupancy sensor 3 is operatively connected to the control element 9 and to the control signal transmitter 7.

The power supply 13 is operatively connected to components in the control circuit 1 to supply power from the source of power 14 as necessary to power the control circuit 1. For simplicity the connections between the power supply 13 and the other components of the control circuit 1 are not shown in the FIG. The power supply 13 could be operatively connected to an alternative source of power, such as a solar charged battery power source, not shown, for outdoor applications. The power supply 13 could be integrated with a power supply, not shown, of the appliance, or could be separate therefrom.

In operation, when the occupancy sensor 3 senses an occupant, not shown in FIG. 1, the occupancy sensor 3 outputs a signal to cause the control element 9 to control power from the source of power 14 to the appliance 15. Similarly, when a control signal is received by the control signal receiver 5 the receiver 5 outputs a signal to cause the control element 9 to control power from the source of power 14 to the appliance 15. At the same time, the control signal transmitter 7 is activated based on the signal from the occupancy sensor 3.

The control of power by the control element 9 may activate the appliance 15. Alternatively, the control of power may simply increase the amount of power already being provided to the appliance 15, through the control element 9 or otherwise. For example, an appliance 15 may be operating at a standby power and the control element 9 increases the power provided to the appliance to full power. This could be used for example to increase a lighting appliance 15 from dimmed to full illumination.

As shown, the control element 9 may be for example a normally open switch; although this is typically desirable, it is not a requirement. It will be evident to those skilled in the art that a control element 9 could be configured utilizing one or more normally closed switches, not shown.

Furthermore, the control element 9 could take many forms. For example, a relay could be used for the control element 9. As an alternative example, for AC sources of power, particularly in high power applications, the control element 9 could be a triac. The control element 9 may include more sophisticated control circuitry such as a combination of discrete logic elements, a microcontroller or microprocessor, or a combination thereof to provide additional functionality. Many other control element configurations will be evident to those skilled in the art.

It is to be recognized that the potential control range of a control circuit 1 from an occupant will be a combination of an area sensed by the sensor 3 and the transmission range of a control signal receiver 5 and control signal transmitter 7 pair. It may be desirable to select a desired field of view for the sensor 3 and transmission range for a control signal receiver 5 and control signal transmitter 7 pair to configure a particular system for a particular application. The transmission strength of the control signal transmitter 7 must transmit a detectable control signal at least beyond the distance of the next adjacent appliance 15. The strength of the control signal to be detectable will depend in part on the sensitivity of the control signal receiver 5. If desired this can also be settable at the installation location to set the transmission range of a control signal receiver 5 and control signal transmitter 7 pair.

A reception set mode can be provided for the control circuits 1 to be used post-installation for range setting. When in reception set mode a control circuit 1 will indicate reception of a control signal by the control signal receiver 5. Such indication could be by way of illumination of a light, for example the light of the lighting appliance 15. The light could be set to simply flash when a control signal is received. The reception set mode could be activated by a simple on-off switch.

Similarly, a transmit test mode can be provide for the control circuits 1 to be used post-installation for range setting. When in transmit set mode a control circuit 1 will transmit a control signal. Transmit set mode could be activated by a simple momentary switch.

The functions of a received set mode and transmit set mode could be implemented, for example, under control of a microprocessor or microcontroller within the control element 9.

Range testing and range setting could be performed by activating receive set mode for various control circuits after installation, and activating transmit set mode from another control circuit to see which control circuits indicate reception of the control signal. If signal transmission strength is an issue then transmission strength can be set. If signal reception is an issue then the reception sensitivity of an individual control circuit can be set.

In order to reduce the effort required for range setting it may be desirable to include remote control such as by infrared or other directional remote control to activate a set mode and to set transmission strength and reception sensitivity.

In most applications occupants will want to control more than the immediately adjacent appliance. For example, in a parking garage occupants will want a significant portion of the area in view to be illuminated, if not the entire area in view.

As it cannot be predicted with certainty how quickly or in which direction an occupant will travel, it may also be desirable to ensure that a number of appliances 15 are within range of one another and within a reasonable area around the occupant. In many situations, such as a parking garage, an occupant is uncomfortable if only a small portion of a visible area surrounding the occupant is illuminated.

For some applications the control signal transmitter 7 transmission strength can be set sufficiently high to control distant appliances 15. For example, in the event that an occupant enters through a door to a parking garage and is sensed by an adjacent control circuit. The adjacent appliance (a light appliance) is activated and the sensing control circuit 1 transmits a signal throughout a floor of the garage to activate all other lighting appliances on the floor within range of the control signal transmitter 7 of the sensing control circuit 1. The sensor 3 field of view should sense occupancy over at least an area half way to the next adjacent light to avoid blind spots to the sensors 3.

The area covered by the sensor 3 will be a combination of the field of view of the sensor 3 and the height of the sensor 3.

Thus, the field of view of the occupancy sensor 3 should be matched to the area to be covered by the appliance 15. As the area to be covered by the appliance 15 will determine the spacing between appliances 15 and the transmission strength required for a control signal transmitter 7. Matching does not require an identical correspondence between the field of view of the sensor 3 and the area to be covered by the appliance 15. In fact, overlapping may be desirable in order to avoid failure to control due, for example, to a faulty sensor 3.

The area to be covered by an appliance 15 may overlap with an adjacent appliance 15, for example in lighting applications to provide even lighting. In some applications the control signal transmitter 7 transmission strength can be set to communicate with distant control circuits 1 for control of distant appliances 15.

This description will be made with emphasis on lights as example appliances 15. It is to be recognized that other appliances that are controllable based on output from an occupancy sensor, such as thermostats or cameras, not shown, could be used in place of the lights with consequent modification to layout of appliances 15 for a particular application.

As shown in FIG. 1, the control circuit 1 can control the appliance 15 by controlling the application of power from the source of power 14. Some appliances 15, such as for example many cameras, can be controlled by a control signal independent of the source of power to the camera. In such a case the control element 9 does not need to be operatively connected to the source of power 14 for controlling the appliance, but can provide a compatible appliance control signal on the output 16 of the control element 9.

Figure 2:
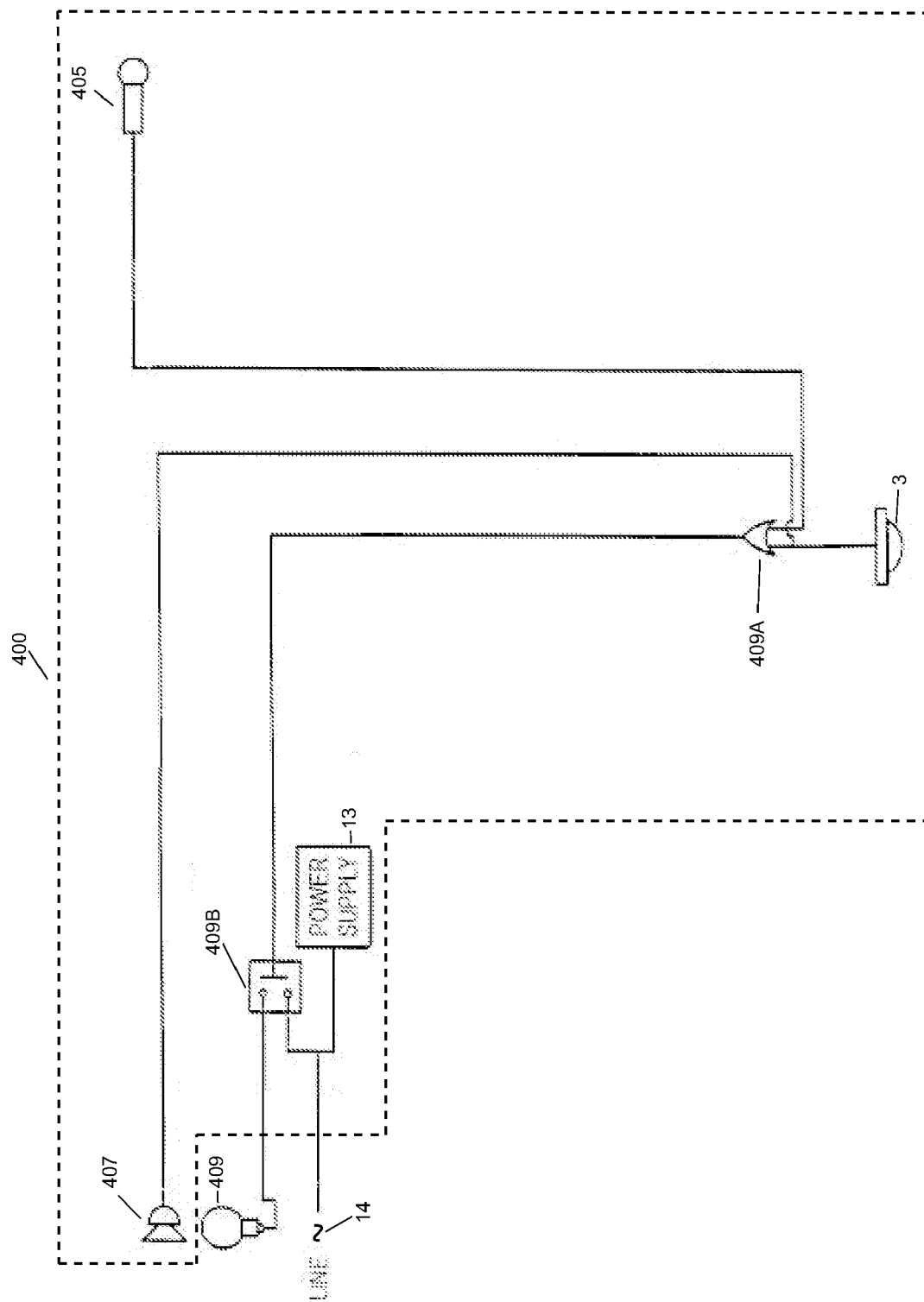
FIG. 2 is a schematic diagram of an example control circuit in accordance with an embodiment of the invention connected between a source of power and a light.
Figure 3:
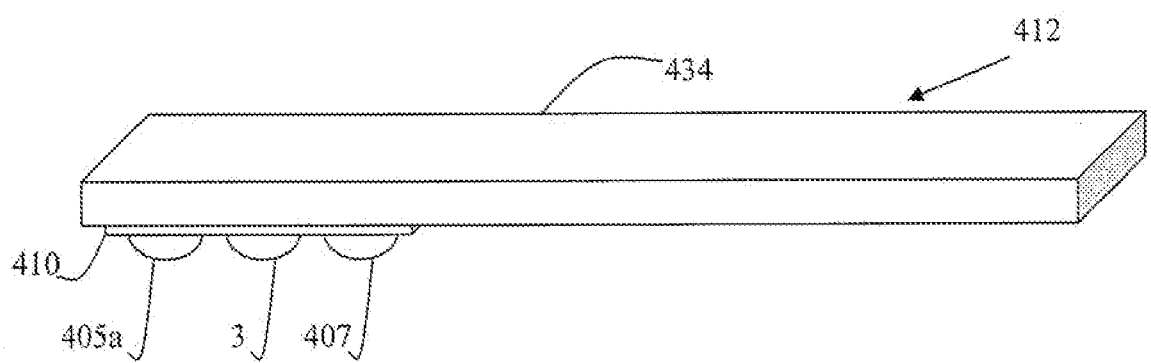
FIG. 3 is a perspective view from above, to one side and to one end of a light fixture incorporating the control circuit of FIG. 2.

Referring to FIGS. 2 and 3, an example control circuit 400 is similar to the control circuit 1; however, the control signal is an ultrasonic control signal, the control signal receiver 5 is a microphone 405, and the control signal transmitter 7 is a speaker 407. The control circuit 400 is shown used in association with a light 409 as the appliance 15; however, the control circuit 400 could be utilized with other types of appliances 15. Ultrasonic control signals provide a wireless mode of communication between control circuits 400. Other wireless or wired modes could be utilized.

In the control circuit 400 the control element 9 utilizes an OR gate 409A and a switch 409B. The OR gate 409A superimposes output from the microphone 405 with output from the occupancy sensor 3.

The microphone 405 can be an omnidirectional microphone 405 to receive control signals from any direction. Similarly, the speaker 407 can be an omnidirectional speaker 407 in order transmit control signals in all directions. As an alternative, to increase range or to direct control signals toward, or away from specific control circuits, a directional speaker 407 can be used. Similarly, to increase range or to receive control signals from a specific direction a directional microphone 405 could be used. Multiple directional microphones 405 can be used for multiple specific directions. Similarly, multiple directional speakers 407 can be used for multiple specific directions.

The microphone 405 and speaker 407 are forms of electrical-sound wave transducers. It is possible to utilize a two-way electrical-sound transducer to combine the microphone 405 and speaker 407 into a single unit. Such a transducer may include a piezoelectric transducer. Multiple piezoelectric transducers can also be used separately in place of the microphone 405 and speaker 407.

If desired, an ultrasonic control signal strength can be easily set using a manually adjustable variable strength signal generator and amplifier in the control circuit 400, see signal generator and amplifier example in a later FIG., driving the speaker 407 to configure a transmission range of the control circuit 400 for a particular lighting system layout. A single format of signal (for example a tone at a specific frequency) can be used for each control circuit 400 as a range from one control circuit 400 can be set for specific lighting system layouts in such a manner as to avoid undesired control of other control circuits 400 outside the range.

Range can be preset for use in association with given light fixtures with known lighting specifications. Alternatively, range can be set during installation or after installation for a specific lighting system layout. In many instances on-site range setting will be a simple process of determining that all desired lights illuminate and no undesired lights illuminate, and adjusting control signal range accordingly. This is particularly true where a single control signal is used for transmission from all control circuits 400.

The lighting control circuit 400 can be provided as a discrete module 410 in its own housing for incorporation into a light fixture 412, see FIG. 3, which also incorporates the light 409, not shown in FIG. 3. The light fixture 412, except for the control circuit 400, is shown, for example, as a standard tubular fluorescent light fixture. It will be evident to those skilled in the art that the control circuit 400 is shown oversize with respect to the remainder of the light fixture 412. This is done for ease of reference to the various components of the control circuit 400. The components of the control circuit 400 perform similar functions to the components of the control circuit 1 and the previous description thereof will not be repeated.

Installation can be fairly simple with the control circuit 400 simply wired between the light 408 and a power source 14. The control circuit can be particularly suitable to retrofit application as a power source 14 is typically available for providing power to installed appliances 15. The control circuit 400 need not be within the appliance housing 434, but can be installed on an exterior of the housing or separately from the housing. Also, the control circuit 400 need not have its own housing. The control circuit 400 can utilize the light fixture housing 434 as a housing for the control circuit 400.

The microphone 405 and the speaker 407 are shown extending downwardly from fixture housing 434. This allows the control signals to be transmitted to and received from other control circuits 400 without being blocked by the housing 434. This may be a design consideration in particular for ultrasonic signals. It may not be a significant factor for other forms of transmission, such as for example RF wireless signals. It would not be a concern for a line carrier modulated signal operating through lines from the source of power 14 that interconnect control circuits 1. Such a wired system could be utilized for retrofit applications utilizing the control circuit 1 without having to rewire.

The occupancy sensor 3 is also shown as extending downwardly from the lighting fixture 412. This is not necessary. The occupancy sensor 3 need only be able to sense from a desired area below the lighting fixture 412 as discussed above. The sensor may be, for example, a motion sensor detecting changes in infrared energy in the desired area. Such motion sensors are typically used in security systems and the like. As a further example, a motion sensor may be a radar type sensor such as those used at the doors of a grocery store. Similarly, a motion sensor could be of a sonar type. The sensor 3 may incorporate sensors of different types to improve reliability and avoid false triggers or lack of a trigger. Other types of occupancy sensor can be used depending on their particular suitability to the environment in which the fixture 32 is to be located.

Figure 4:
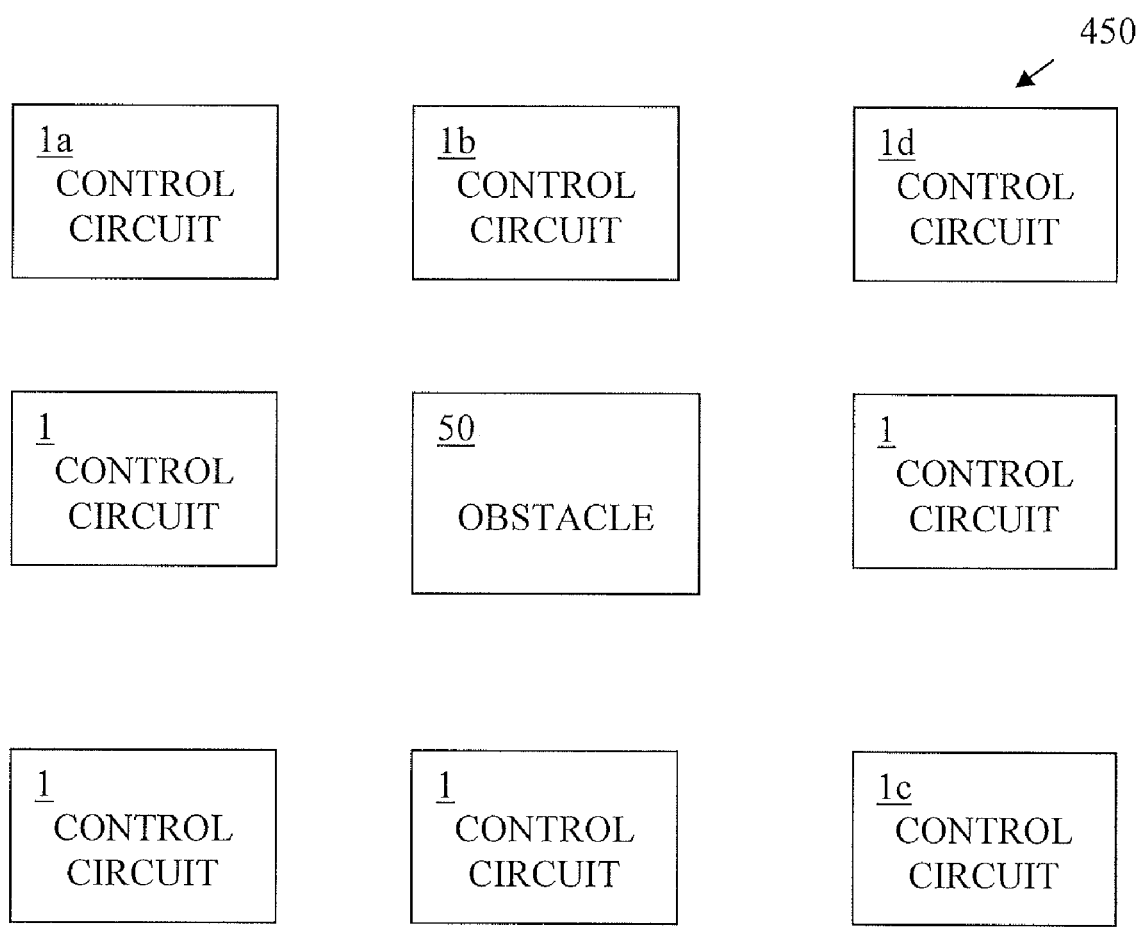
FIG. 4 is a block diagram of a system of control circuits in accordance with the embodiment of FIG. 1 distributed about a space containing an obstacle.

Referring to FIG. 4, a lighting system 450 has multiple control circuits, for example control circuits 1. Reference will be made in the following description to the control circuit 1 as an example. Reference will also be made to components of the control circuit, such as for example transmitter 7. The control circuits will be described generally using reference numeral 1 and specific control circuits will be referred to using reference numeral 1 followed by a letter, for example 1a. It is understood that reference numeral 1 alone when used in this description includes reference numeral 1 followed by a letter, such as 1a. For simplicity individual components of the control circuit 1, such as for example transmitter 7, are not shown in the FIG. and it is to be understood that the reference numerals used for those components are those used in other FIGS. and the related text for those FIGS. Similarly, for simplicity, the appliances associated with the control circuits 1 are not shown, but are referenced in the related description.

A control signal of one transmitter 7 from one control circuit 1a is received by another control circuit 1b and an appliance 15, not shown in FIG. 4, associated with the second control circuit 1b is activated upon receipt of the control signal.

The control signal transmitter 7 of a control circuit 1 can be designed to be activated upon receipt of a control signal at the control signal receiver 5 of that control circuit 1; however, this may require a mixture of control circuits 1 which permit relaying of the control signal with control circuits 1 that do not permit relaying to prevent undesired relaying of the control signal to all control circuits 1 resulting in control of all light fixtures 15. For example, control circuits 1 that permit relaying could be grouped to provide asymmetric control of control circuits 1. A directional control signal transmitter 7 can also be used for this purpose.

In some situations a control circuit 1a control signal receiver 5 cannot receive a control signal from an adjacent control signal transmitter 7 of another control circuit 1c. This may occur due to an obstacle 50 between control circuits 1a, 1c or to one control circuit 1a being out of range of another control circuit 1c. A control circuit 1d similar to a control circuit 1 with relay capability and without a switch for an associated appliance 15 can be used to relay a control signal between the control circuits 1a, 1c. The control circuit 1d may be a control circuit 1 with relay capability where the switch capability is used or unused.

In this way, sensing of an occupant by an occupancy sensor 3 of a first circuit 1a will control an appliance 15 associated with the first circuit 1a and will control an appliance 15 associated with a second circuit 1c. The appliances 15 are not shown in FIG. 4 for simplicity.

More sophisticated systems can be developed utilizing addressed control signals such that an addressed control signal is transmitted from a signal transmitter 7 to a particular signal receiver 5 at a particular appliance 15. A combination of range setting and addressing can be used. For example if it is desired to distinguish between control circuits 1 associated with appliances 15 in close proximity to one another then a limited number of addresses can be made available and the range set to reach only uniquely addressed appliances within range of the transmitting appliance 15. For example nine unique addresses can be used for situations where repeating arrays of nine appliances 15 are arranged regularly. The range of the appliances 15 is set only to reach eight appliances 15 adjacent to any one appliance 15.

Addressed control signals, signal transmitters and signal receivers can make installation more complex; however, they can also make for more flexible or sophisticated lighting system configurations.

Figure 5:
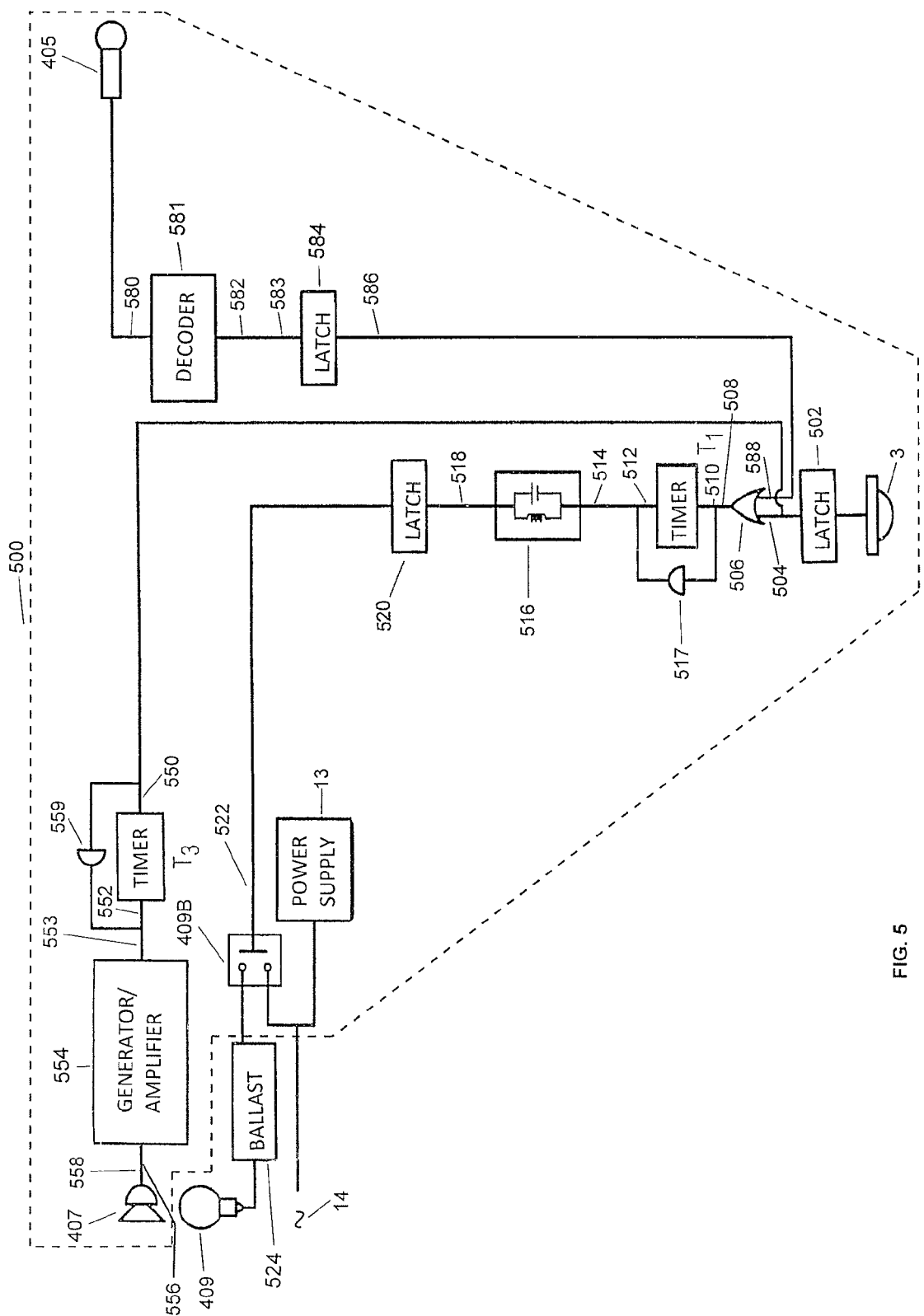
FIG. 5 is a schematic diagram of an example control circuit in accordance with an embodiment of the invention connected between a source of power and a light.

Referring to FIG. 5, a further example control circuit 500 is similar to the control circuit 400 with additional details and functionality. Other components having similar references numbers to previously described components and behave similarly to the previously described components except to the extent expressly described herein. Accordingly, the description of those components will not be repeated.

Once again, the control circuit 500 is described with respect to a light 409 as the appliance 15. It is to be recognized that the control circuit 500 could be used to control other types of appliances as indicated elsewhere herein.

Occupancy sensor 3 is operatively connected to a latch 502. Latch 502 is operatively connected to an input 504 of OR gate 506. Output 508 of OR gate 506 is operatively connected to an input 510 of a timer T1. Output 512 of timer T1 is operatively connected to an input 514 of a smoothing circuit 516. A resistor-capacitor (RC) smoothing circuit 516 is shown. Other smoothing circuits can be used. Output 508 of OR gate 506 is also connected in parallel with the timer T1 to the input 510 of the smoothing circuit 516. A diode 517 between output of OR gate 506 and input 510 can be used to provide directionality to the parallel connection. Output 518 of smoothing circuit 516 is operatively connected to latch 520. Latch 520 is operatively connected to a control input 522 of switch 409B. Switch 409B is operatively connected between line source of power 14 and a ballast 524 for light 409. Some lights 409 may utilize control circuitry such as for example ballasts or drivers, with for example, fluorescent lamps or light emitting diodes.

Any timer herein may provide for the ability to set the time delay. The timer may provide for the ability to set the time delay on-site of installation. The timer may provide for the time delay to be manually settable or to be set using a manual or automated installation tool.

Figure 6:
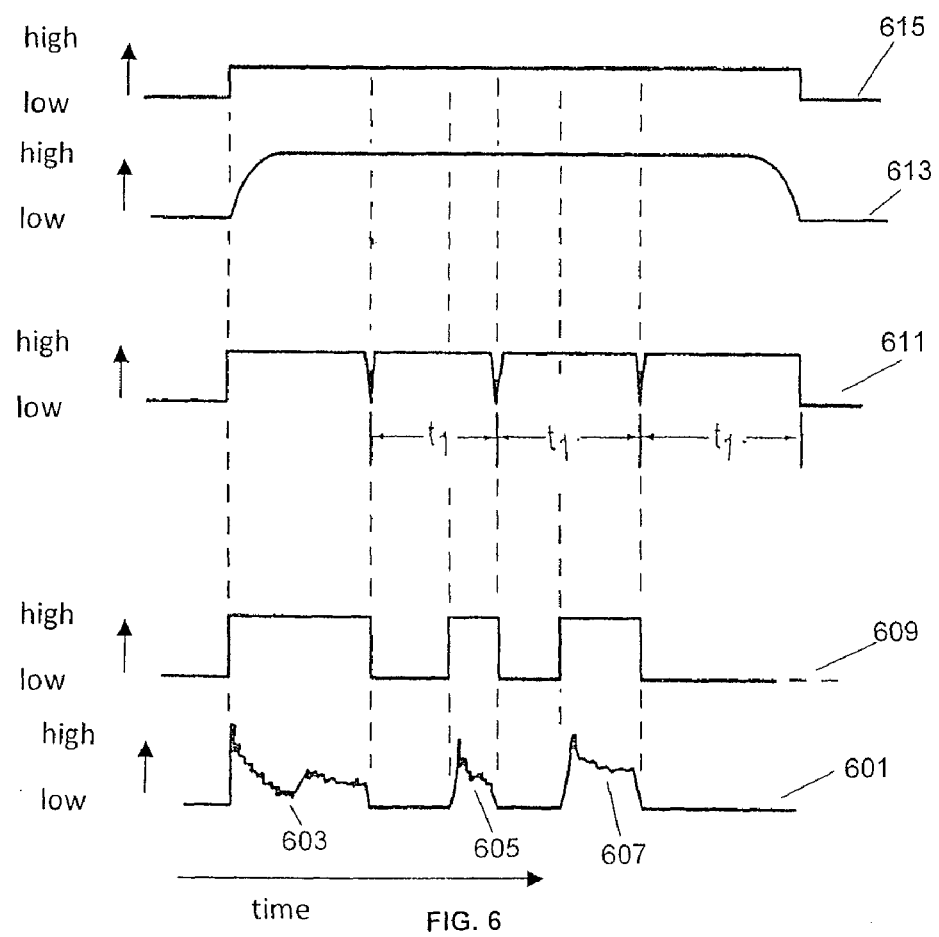
FIG. 6 is a graphical series of example signals over time from the control circuit of FIG. 5.

Referring to FIG. 6, a series of example signals over time for various locations in the control circuit 500 are illustrated. A time axis increases from left to right horizontally for all of the timing signals. Each timing signal starts at logic low and ranges to logic high with activity at the sensor 3. Each signal has it own vertical axis beginning at logic low when timing commences.

Timing signal 601 illustrates output of occupancy sensor 3 with activity in the signal at 603, 605, 607 indicating occupation in an area covered by the sensor 3. Timing signal 609 illustrates output of latch 502 which provides a square edged waveform of timing signal 601. Timing signal 611 illustrates output from the timer T1 for the timing signal 609 at latch 502. Connecting the output of OR gate 506 in parallel with timer T1 provides a signal to the smoothing circuit 516 when the occupancy sensor 3 indicates that an area is occupied.

Timer T1 is set to time out a given time after a signal at its input 510 ceases to indicate occupancy. For example, this allows time for a person to return to an area or an occupant to move within an area to reactivate the occupancy sensor 3. Thus, timing signal 611 is high when the occupancy sensor indicates the area is occupied. Timing signal 611 goes high immediately after occupation ceases and stays high for timer period t1. As occupation continues to be indicated from timing signal 601 at 605, 607, when t1 expires timing signal 611 remains high until occupancy ceases and timer T1 is reset. As there is no occupancy after 607, timing signal 611 goes low after t1 expires.

Timing signal 613 illustrates output from the smoothing circuit 516 for the timing signal 601. The smoothing circuit 516 smoothes transitions in the output signal 611. For example, the negative going spikes are removed where occupancy ceases and timer T1 commences timing.

Timing signal 615 illustrates output of the latch 520 for the timing signal 601. The latch provides a square edge to the remaining transitions in the signal 613 from the smoothing circuit 516.

The output of the latch 520 signals the switch 409B to close when the output is high causing connection of line source of power 14 to ballast 524 and control (for example by activation) of the light 409. The switch 409B is opened to control (for example, to deactivate) the light 409 when the output of the latch 520 goes low.

Referring again to FIG. 5, output of latch 502 is also operatively connected to input 550 of timer T3. Output 552 of timer T3 is operatively connected to an input 553 of signal generator and amplifier 554. Signal generator and amplifier 554 output 556 is operatively connected to input 558 of speaker 407. Output of latch 502 is also connected to the input 553 of signal generator and amplifier 554 in parallel to timer T3. Diode 559 between output of latch 502 and input 553 can be used to provide directionality to the parallel connection.

In operation, timer T3 behaves in a similar manner to timer T1. Signal generator and amplifier 554 generates and amplifies a signal indicating occupancy plus a timer period indicated by timer T3. The addition of the timer period from timer T3 prevents the signal from being too brief for short occupancy indications from the sensor 3.

Microphone 405 is operatively connected to an input 580 of a signal decoder 581. An output 582 of signal decoder 581 is operatively connected to an input 583 of a latch 584. An output 586 of latch 584 is operatively connected to an input 588 of OR gate 506.

In operation, microphone 405 receives sounds, including control signals from another control circuit 500. Signal decoder 581 attempts to decode the received sounds to determine if a control signal is being received and, if so, the signal decoder 581 outputs a signal to the latch 584. The latch latches the signal to provide a square edge signal that is input to the OR gate 506. The OR gate 506 superimposes the signals from the latch and 584 and latch 502 to operate the light 409 in a manner similar to that described previously for signals from the sensor 3 alone. Thus, the light 409 is controlled by occupancy sensed by the occupancy sensor 3 or control signals received from the microphone 405, or both.

The signal decoder 581 may be a simple bypass filter to pass only signals at an ultrasonic level. Ultrasonic frequencies are above the range audible to the human ear. Typically ultrasonic frequencies are considered to be above 20000 Hz. Ultrasonic signals are used so as not to disturb occupants and to avoid interference from non-ultrasonic frequencies. It is not necessary in all applications for the output of the microphone to be filtered. This may result in control initiated by audible noises. In effect, the microphone 405 may act as a combined occupancy sensor 3 listening for noises from an occupant in addition to acting as a control signal receiver 5. For some applications this may result in unnecessary control where audible noises may be generated other than by an occupant in a space where occupancy is intended to be sensed.

Figure 7:
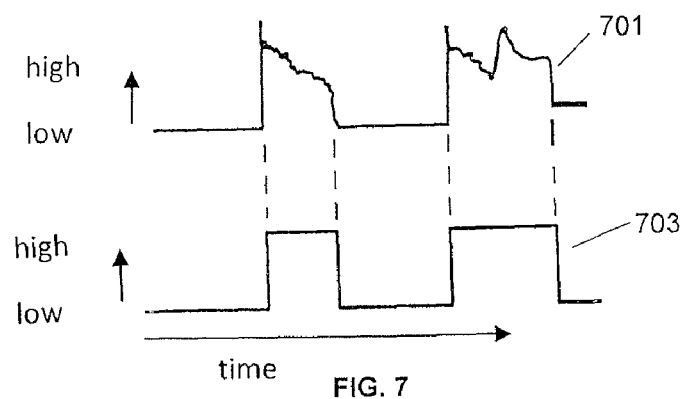
FIG. 7 is a graphical series of further example signals over time from the control circuit of FIG. 5.

Referring to FIG. 7, example timing diagrams 701, 703 illustrates signals at the output 582 of the signal decoder 581 and the latch 584, respectively. As mentioned above, these signals would be superimposed on the signal 609 from the latch 502 with resulting changes to the inputs of the timer T1, smoothing circuit, latch and switch. In the example timing diagrams 613, 615 there would be no change as the signals are already at a logic high throughout the timing diagram.

Figure 8:
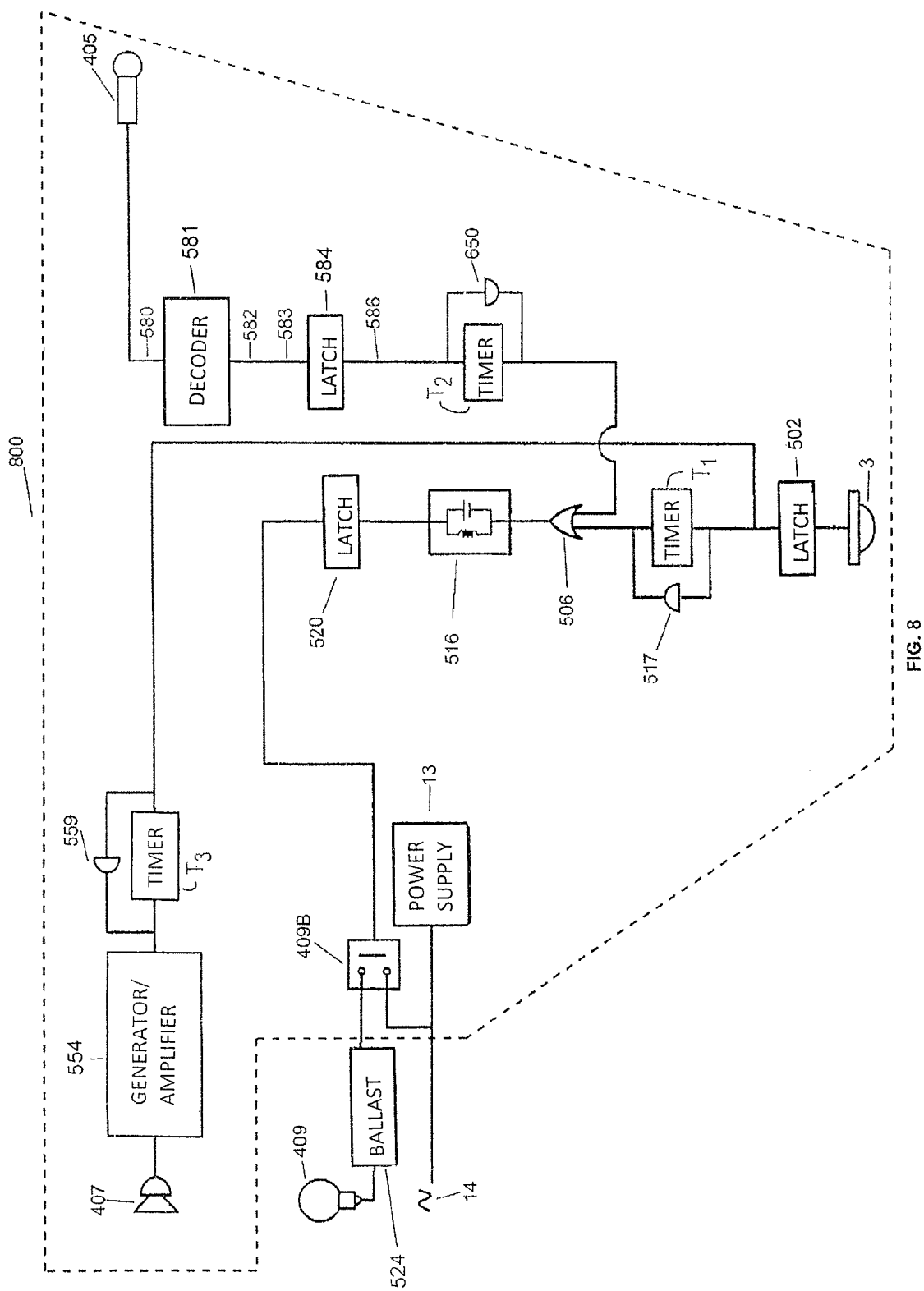
FIG. 8 is a schematic diagram of a further example control circuit in accordance with an embodiment of the invention connected between a source of power and a light.

Referring to FIG. 8, an alternative control circuit 800 is similar to the control circuit 500. A Timer T2 is placed after the latch 584. A parallel connection through diode 650 is again provided about timer T2. Timer T1 and its parallel connection are operatively connected between latch 502 and OR gate 506. Output of OR gate 506 is operatively connected as an input to smoothing circuit 516.

In operation, the provision of timers T1, T2 can provide independent control over the time for which the switch 409B is closed after the microphone 405 and occupancy sensor 3 cease to provide signals to their respective timers T1, T2.

It is to be noted that many alternative circuits could be used in place of the circuits 400, 500, 800 to provide similar or additional functionality. This is particularly the case where logic circuits are used whether implemented in discrete components, programmable logic arrays, or general purpose integrated circuits such as a microcontroller or microprocessor.

It is to be noted that the description herein in generally made with respect to coverage of an area or sensing of an occupant in an area. Typically an appliance, sensor or the like will cover an area resulting from the project of a field from the appliance, sensor or the like onto a surface. The projection onto the surface is the area being covered. Matter is within the area when it is between the appliance, sensor or the like and the area covered by the appliance, sensor or the like.

Similarly, if a person remains stationary for sufficient time such that the control circuits 1 cease to control their associated appliance 15, such as by deactivating a lighting appliance 15, then the occupant can re-control the associated appliance 15, e.g. reactivate the light appliance 15, by moving in the field of view of any occupancy sensor 3 of any control circuit 1 of the floor.

Figure 9:
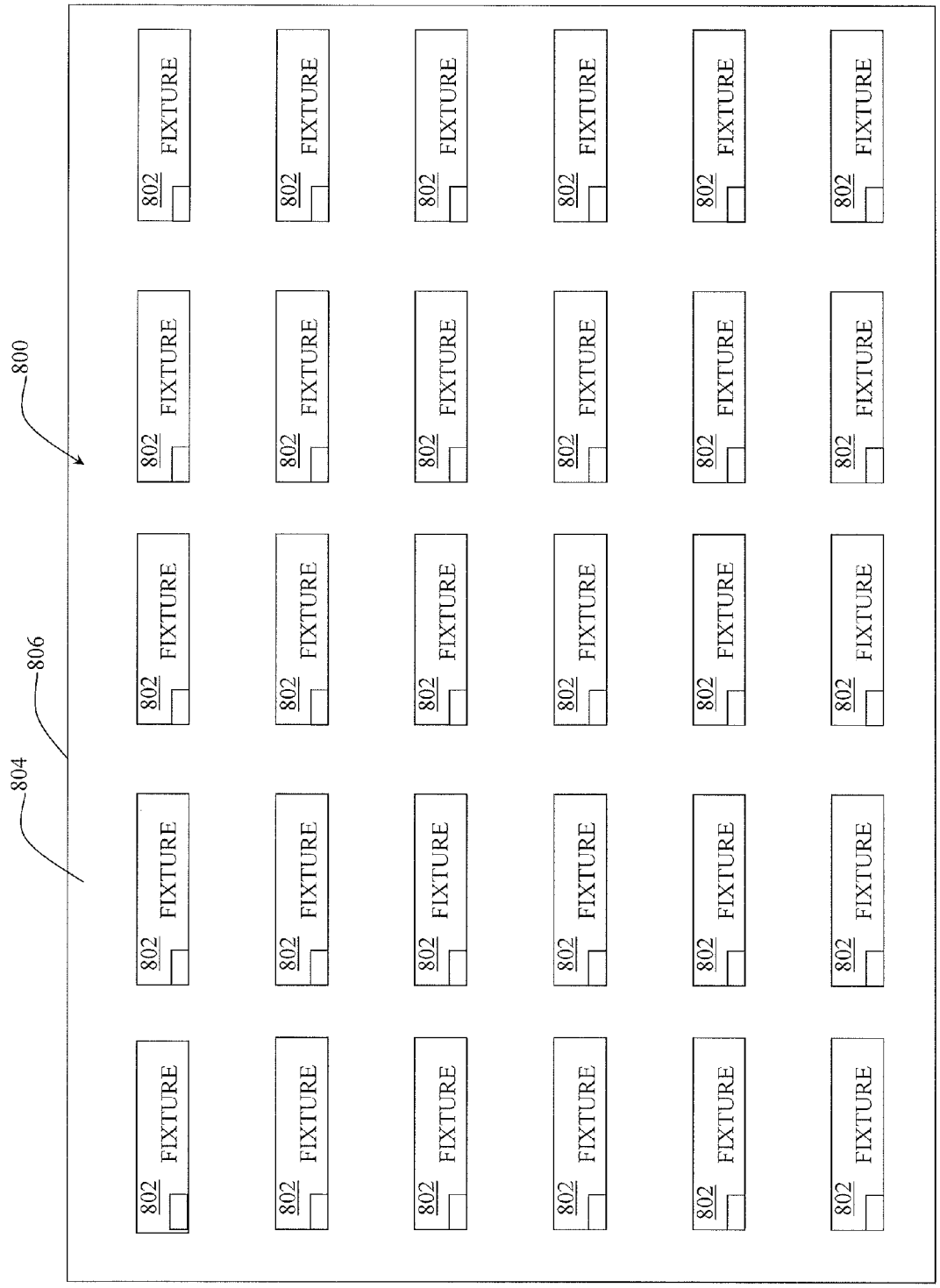
FIG. 9 is a plan view of an embodiment of a lighting system employing an embodiment of a control circuit in accordance with the present invention.

Referring to FIG. 9, example implementations for a lighting system 800 incorporate light fixtures 802, such as for example light fixture 412 with a control circuit (not shown), such as for example, control circuit 1, 400, 500, 800. For simplicity individual control circuits and other components forming part of or used in association with the light fixtures 802 are not shown in the FIG. The structure and operation of the control circuits and other components will be evident based upon the entirety of the description herein and such description will not be repeated in its entirety for this specific example. In this example, light fixtures will be described generally using reference numeral 802 and specific light fixtures will be referred to using reference numeral 802 followed by a letter, for example 802a. It is understood that reference numeral 802 alone when used in this description includes reference numeral 802 followed by a letter, such as 802a.

The light fixtures 802 are laid out in a large space 804 such as a parking garage 806. Initially, the light fixtures 802 are off and the parking garage 806 is empty.

Figure 10:
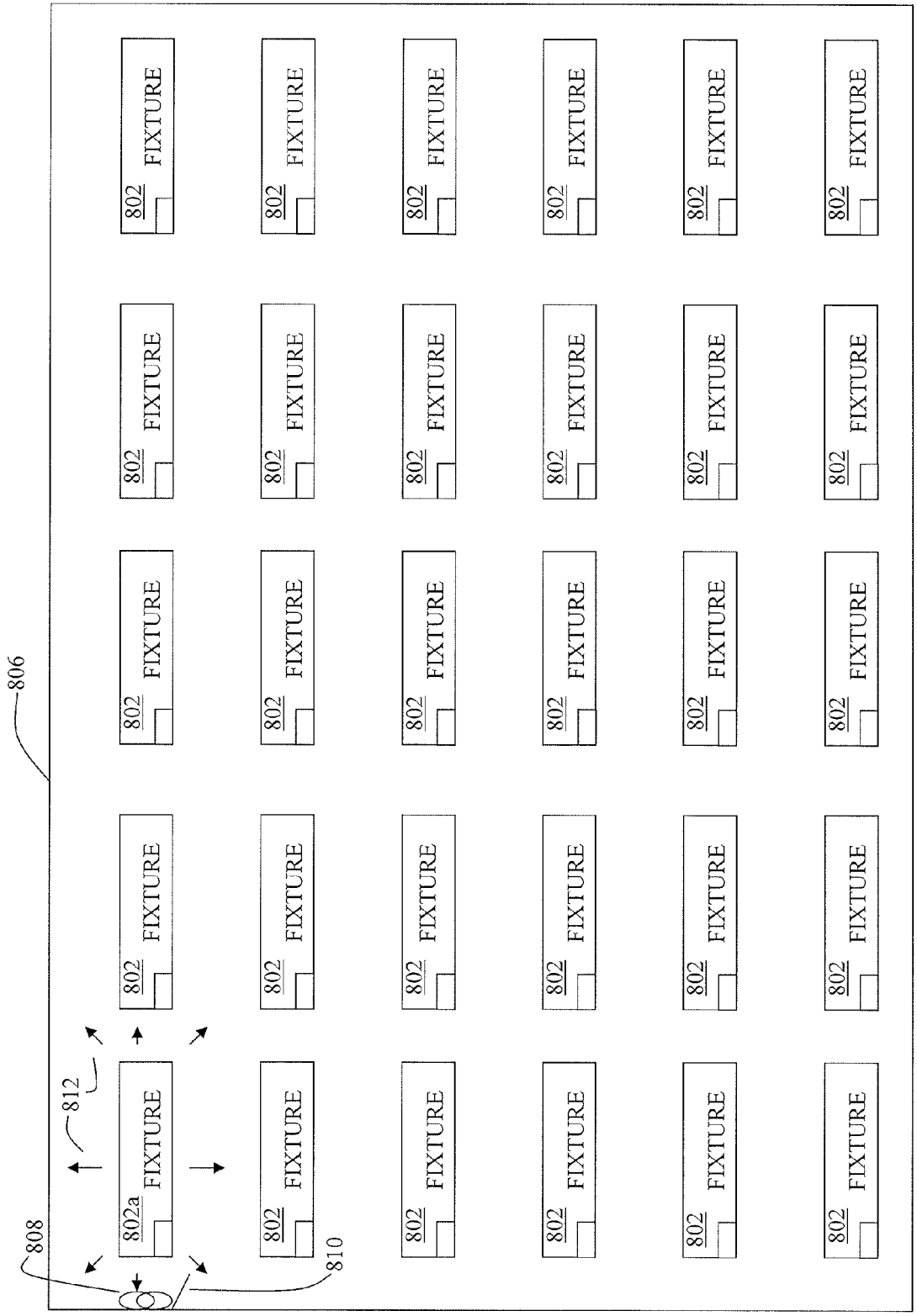
FIG. 10-12 are each the plan view of FIG. 9 illustrating an example operation of the lighting system.

Referring to FIG. 10, when an occupant 808 enters the parking garage 806, for example at a door 810, an occupancy sensor of a control circuit of an adjacent light fixture 802a senses occupancy, the control circuit controls the associated light in the light fixture 802, and the control circuit transmits a control signal 812 indicated by arrows, two of which are provided with a reference numeral in the FIG.

Figure 11:
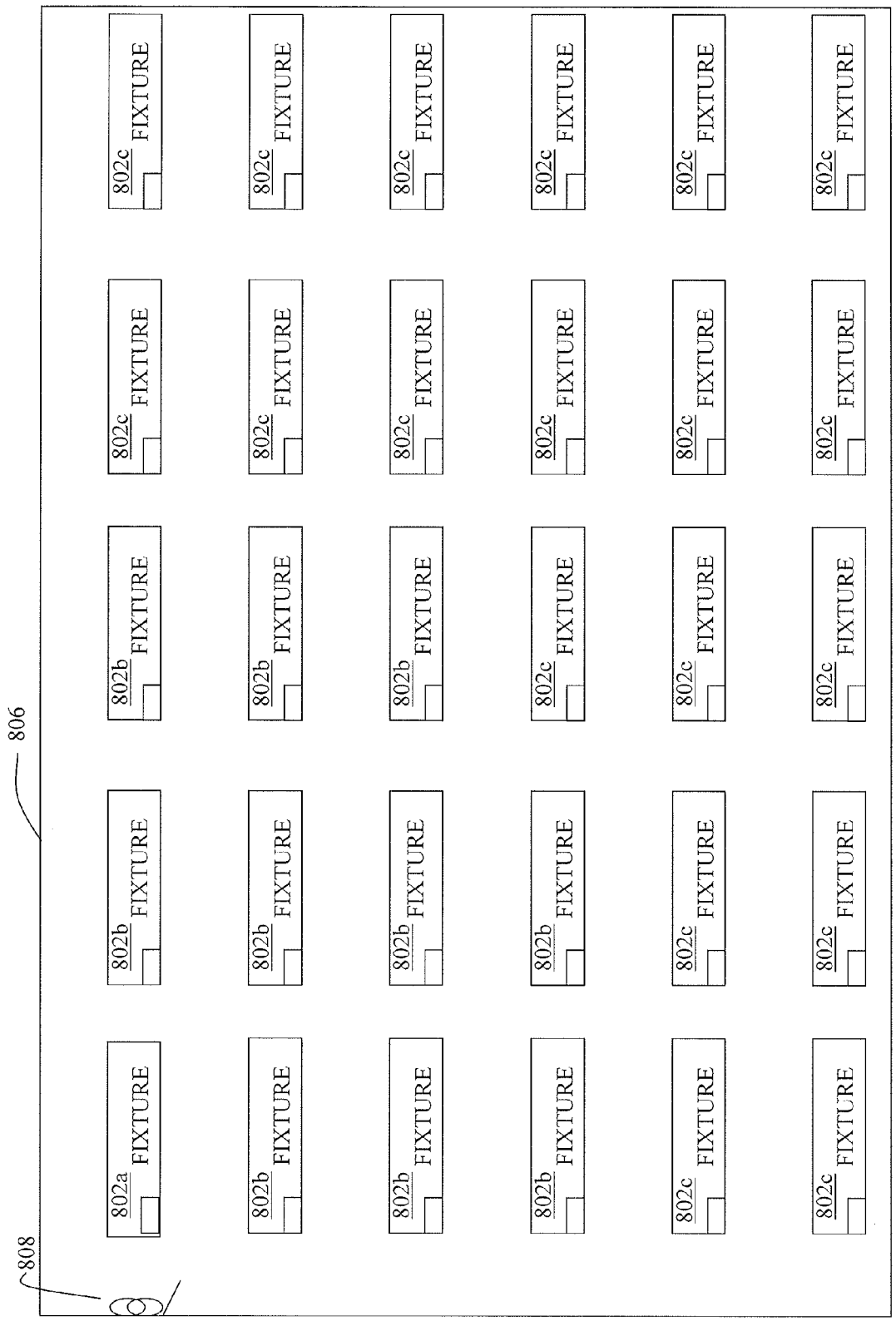

Referring to FIG. 11, the control signal is received at control signal receivers of control circuits of light fixtures 802b within range of the control circuit of the light fixture 802a. The control circuits activate the light in the light fixtures 802b. Light fixtures 802c beyond the range of the control circuit of the light fixture 802a will remain off.

Figure 12:
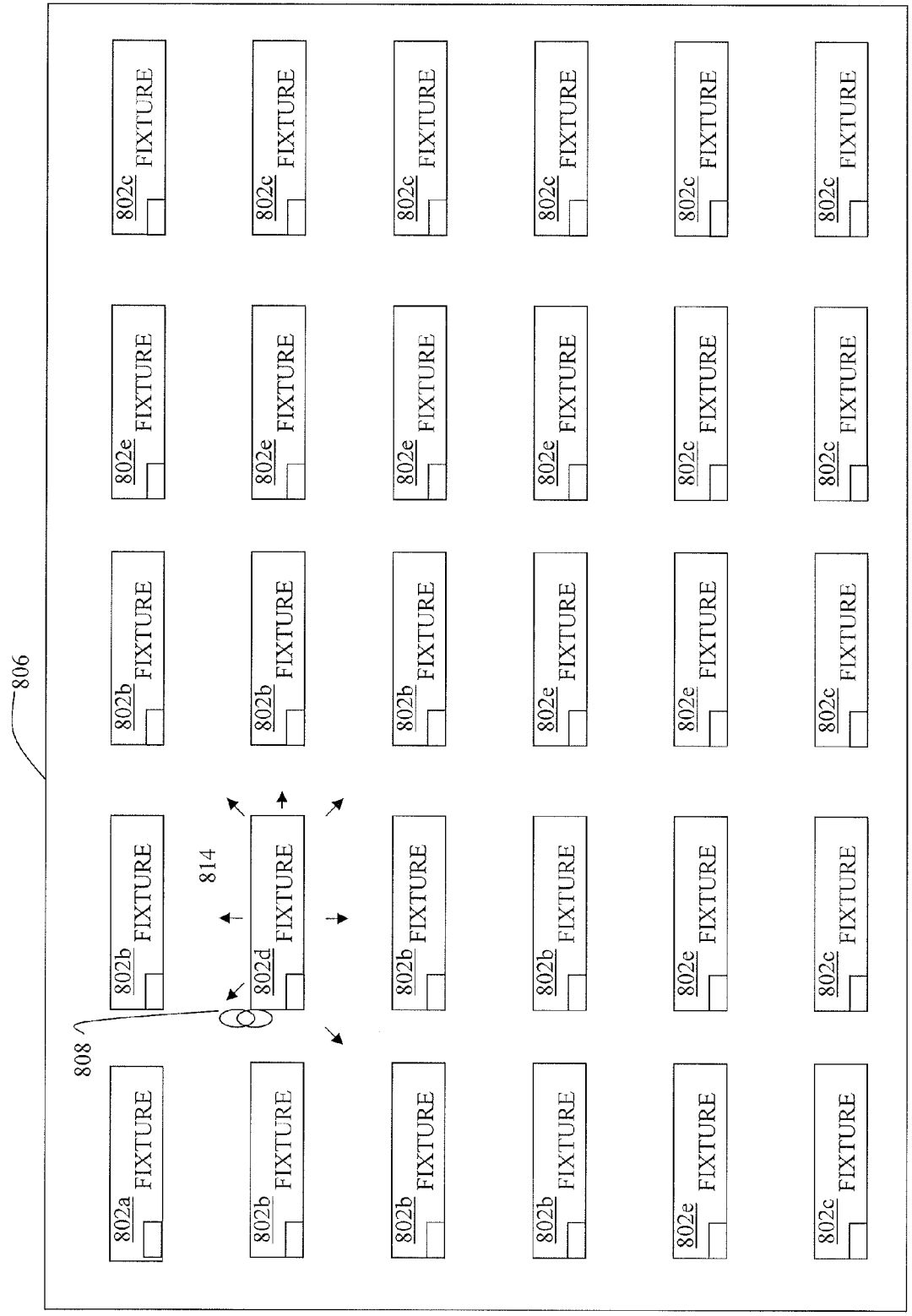

Referring to FIG. 12, if occupant 808 moves such that occupancy is sensed by a light fixture 802d then the light fixture 802d will be activated by its control circuit (if the light circuit was not already activated) and the light fixture 802d will transmit a control signal 814. The control signal 814 may have a different range than that of control signal 812 and cause additional light fixtures 802e to activate.

After a period of time after occupancy ceases to be sensed by a respective light fixture 802a, 802d then the light fixtures 802a, 802b, 802d, 802e will be deactivated by their respective control circuits.

Although the above description is made with reference to some control circuits of light fixtures 802c that are out of range of other control circuits of light fixtures 802a, 802d, it may be desirable for the transmission range of the light fixtures 802 to be set such that the control circuits of all light fixtures 802 are within range of one another, such that the entire space 804 is illuminated if occupancy is sensed by a control circuit of any light fixture 802 in the space 804.

Figure 13:
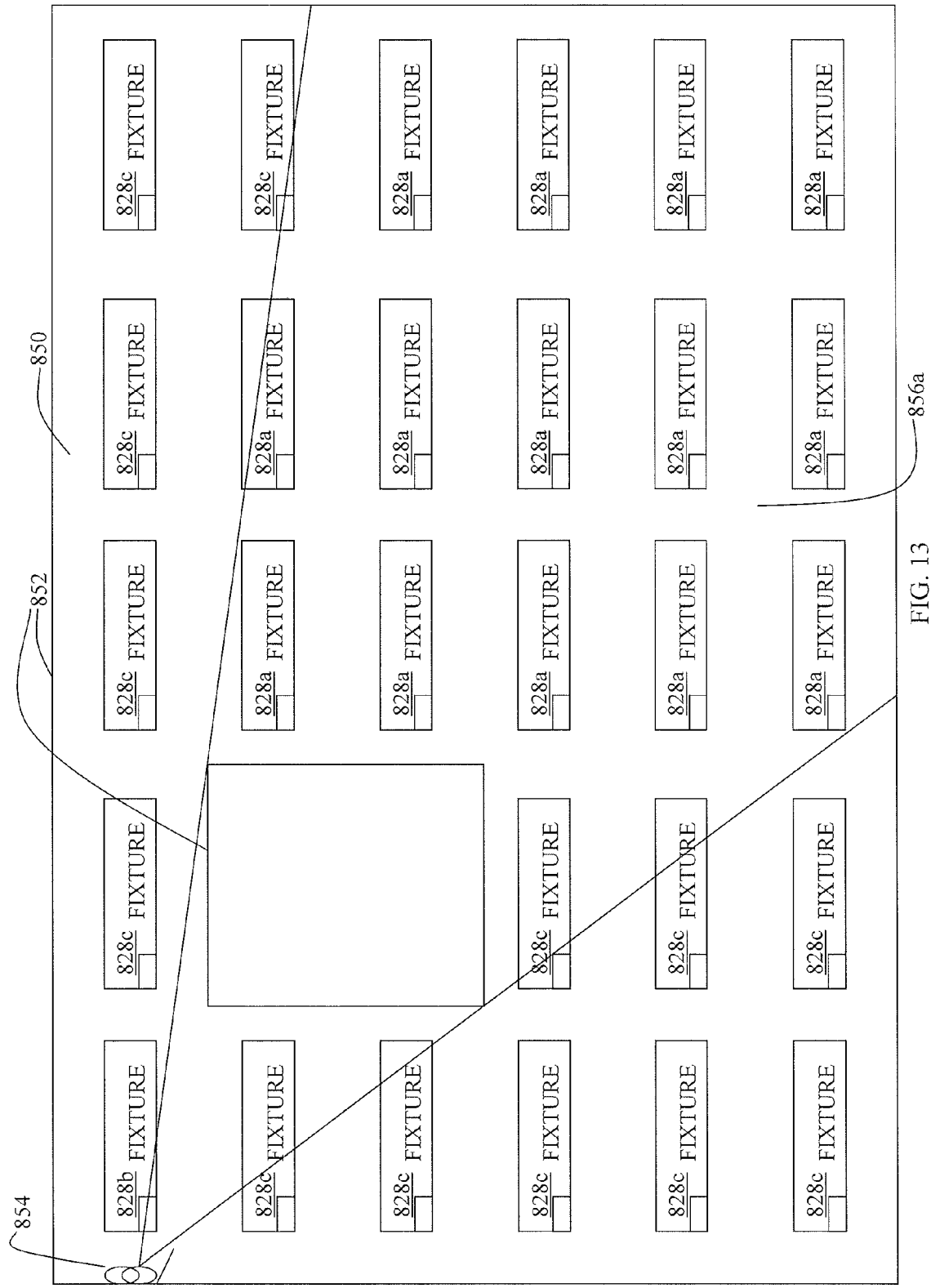
FIG. 13-14 are each a plan view of a further embodiment of a lighting system employing an embodiment of a control circuit in accordance with the present invention in operation about an obstacle.

Referring to FIG. 13, space 850 may contain or be bounded by obstacles, such as walls 852, that obstruct the view of an occupant from an occupant location, for example location 854, to portions, for example portions 856a, of the space 850. It may not be necessary to illuminate light fixtures 828a at least partially within hidden portion 856a as the light fixtures 828a are not within view of the occupant 808. Accordingly, a control signal can be transmitted from light fixture 828b sensing occupancy of the occupant 808 to the light fixtures 828c visible to the control circuit of the light fixture 828b.

Figure 14:
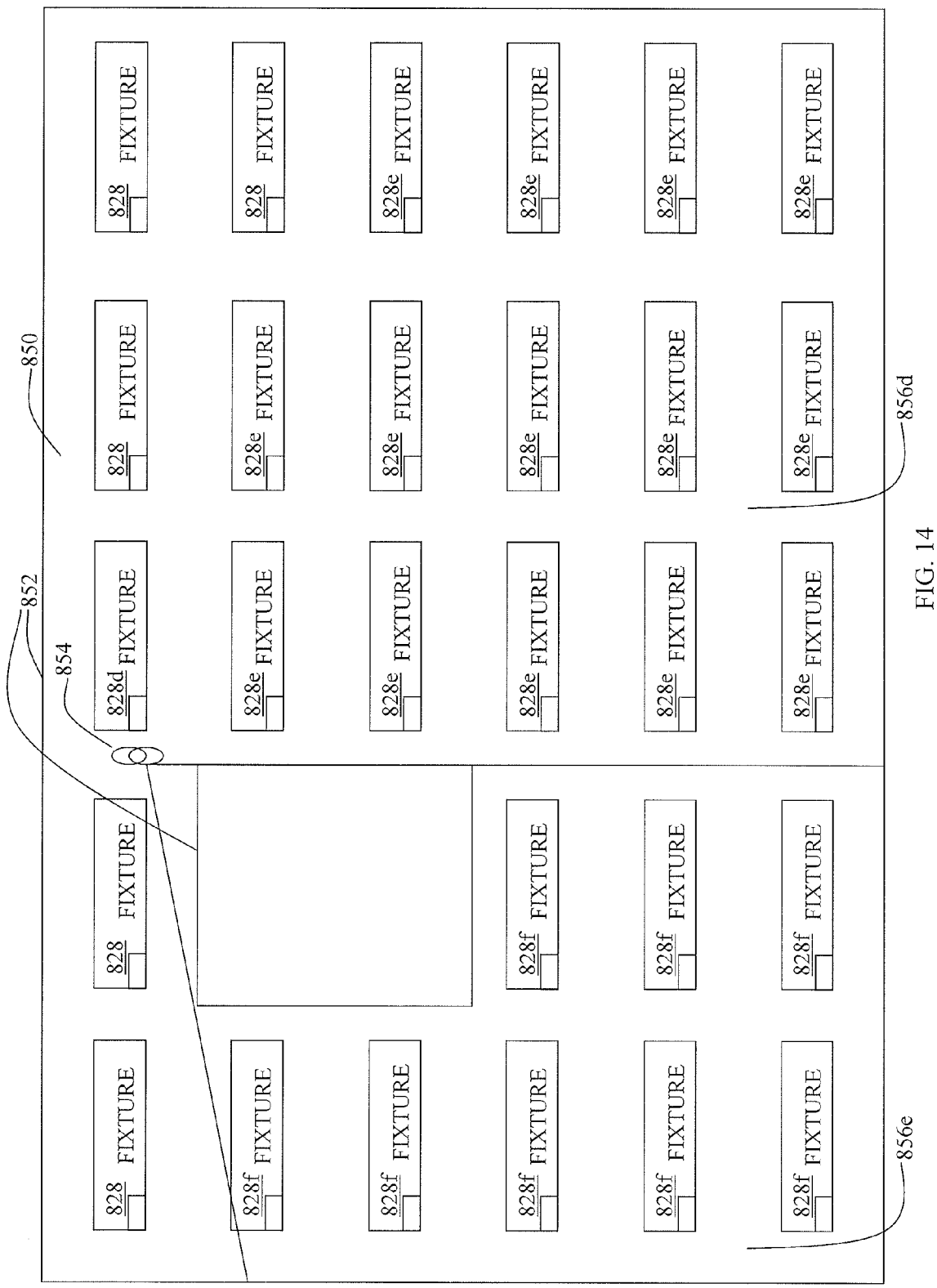

Referring to FIG. 14, as the occupant 808 moves within the space 850 from location 854 to location 855 some portions will remain hidden, some previously hidden portions 856d will become visible and other previously visible portions 856e will become hidden. The occupant 808 will be sensed by a control circuit at light fixture 828d to cause the control circuit to transmit a control signal to activate light fixture 828e to illuminate previously hidden portion 856d. Light fixtures 828f illuminating previously visible portion 856e will time out following a period after last receiving a control signal from the control circuit in light fixture 828b.

The lighting system of FIGS. 13 and 14 provides a moving illumination field for the occupant. Portions of the space are illuminated for the occupant while other portions of the space are not illuminated. The illuminated portions and non-illuminated portions can change as the occupant moves within the space. The occupant can be provided with necessary illumination, while the operator of the space can reduce its operating costs. How quickly fixtures change from illuminated to non-illuminated will depend on timing functions of the control circuits of the light fixtures 828.

Ultrasonic control signals can be well suited to moving field applications as the signal can be easily attenuated by obstacles to avoid inadvertent control of control circuits located behind obstacles. Ultrasonic control signals can also provide some leakage around obstacles to activate control circuits located behind obstacles but near visible portions of the space where an occupant may be accessing shortly, or which could be visible to an occupant, but not in line of sight to a transmitter of a control unit of a fixture 828 that is transmitting a control signal based on occupancy of the occupant 808.

Activation behind obstacles can also be provided by a relay of the control signal as described previously. As an example, control behind obstacles can also be achieved by allowing light fixtures 828 adjacent to the sensing light fixture 828 to relay the control signal. The adjacent light fixtures will have a different transmission field that may allow control light fixtures 828 that would otherwise be behind obstacles.

Relay by only some control circuits within light fixtures 828 may require additional "intelligence" within the transmitting control circuit of a light fixtures 828 and within a receiving control circuit of the light fixtures 828, for example to determine distance between the control circuit or to provide addressing of the control signal. Such intelligence could be incorporated into a program stored in memory of a microprocessor or for a microcontroller utilized in the control circuit to carry out the steps described herein.

Such a microprocessor or microcontroller is also an example of a device that can act as part of the control element to carry out control of the control circuit to perform the functions and provide the features described herein. For simple embodiments it may be desirable to utilize a non-microprocessor or microcontroller implementation.

Radio frequency wireless signals can also be used to penetrate obstacles to activate control circuits. Depending on the particular circumstances in which the control circuits are to be installed, radio signals may provide more inadvertent controls, for example, between control circuits on different floors where only a hallway on one floor is desired to be illuminated. Again, addressing of control signals can assist in limiting such inadvertent control.

Several example control circuits, and systems incorporating such control circuits, and methods of controlling appliances and appliance systems have been described herein. Example lighting systems and light fixtures and methods of controlling the same have also been described. It is to be recognized that specific features and functionality from one example may be utilized in other examples as desired. Accordingly, the description of such features and functions in each example is not repeated herein.

It will be understood by those skilled in the art that this description is made with reference to preferred embodiments and that it is possible to make other embodiments employing the principles of the invention which fall within its spirit and scope as defined by the following claims.

I claim:

1. A light fixture comprising:
   a light,
   a housing that houses the light, and a control circuit comprising:
   an occupancy sensor, a control signal receiver,
a control signal transmitter operatively connected to the occupancy sensor,
a control element operatively connected to the occupancy sensor and to the control signal receiver, and
an output from the control element, the output wired between the light and a source of power,
wherein the control element controls the output to control power from the source of power to the light upon occupancy sensed by the occupancy sensor,
wherein the control element controls the output upon wireless receipt of a first control signal by the control signal receiver, and
wherein the control signal transmitter wirelessly transmits a second control signal upon occupancy sensed by the occupancy sensor, wherein the second control signal is the same as the first control signal in that the first control signal and the second control signal have a single format providing a same message that causes the control element to control the output, the single format being an uncoded signal format at a specified frequency of transmission.

2. The control circuit of claim 1 further comprising a power supply for providing power to components of the control circuit.

3. The control circuit of claim 1 wherein the control element controls power to the output to increase the amount of power supplied to the light.

4. The control circuit of claim 1 wherein the control element controls the power to the output to activate the light.

5. The control circuit of claim 1 wherein the control signal transmitter transmits an ultrasonic control signal, the control signal receiver is a microphone, and the control signal transmitter is a speaker.

6. The control circuit of claim 1 wherein the control transmitter transmits an ultrasonic control signal, the control signal receiver is an ultrasonic transducer, and the control signal transmitter is an ultrasonic transducer.

7. The control circuit of claim 1 wherein signal strength of the control signal transmitter is settable.

8. The control circuit of claim 1 wherein reception sensitivity of the control signal receiver is settable.

9. A system comprising:
a plurality of light fixtures, each light fixture comprising:
a light,
a housing that houses the light, and
a control circuit, each control circuit respectively comprising:
a) an occupancy sensor,
b) a control signal receiver,
c) a control signal transmitter operatively connected to the occupancy sensor,
d) a control element operatively connected to the occupancy sensor and to the control signal receiver, and
e) an output from the control element, the output wired between the light and a source of power,
wherein the control element controls the output to control power from the source of power to the light upon occupancy sensed by the occupancy sensor,
wherein the control element controls the output upon wireless receipt of a first control signal by the control signal receiver, and
wherein the control signal transmitter wirelessly transmits a second control signal upon occupancy sensed by the occupancy sensor, wherein the second control signal is the same as the first control signal in that the first control signal and the second control signal have a single format providing a same message such that receipt by the control receiver would cause the control element to control the output, the single format being an uncoded signal format at a specified frequency of transmission.

10. The system of claim 9 wherein the light fixtures are installed such that at least one control circuit associated with a light fixture is within range of another control circuit to allow for control signals transmitted from the other control circuit to be received by the at least one control circuit.

11. The system of claim 10 wherein the light fixtures are installed such that a plurality of the control circuits are within range of a first control circuit associated with a light fixture to allow for control signals transmitted from the one control circuit to be received by the plurality of the control circuits.

12. The system of claim 9 wherein signal strength of each control signal transmitter is settable.

13. A method of operating a light fixture, the method comprising the steps of:
sensing for occupancy using an occupancy sensor in a control circuit,
sensing for wireless receipt of a first control signal through a control signal receiver in the control circuit, and
if occupancy is sensed or control signals are received then wirelessly transmitting a second control signal through a control signal transmitter in the control circuit and providing an output from the control circuit to control a light in a housing of the light fixture, wherein the second control signal is the same as the first control signal in that the first control signal and the second control signal have a single format providing a same message such that receipt by the control receiver would cause the control element to control the output, the single format being an uncoded signal format at a specified frequency of transmission.

* * * * *